United States Patent
Yanagisawa (10) Patent No.: US 10,611,099 B2
(45) Date of Patent: Apr. 7, 2020

(54) METHOD FOR PROCESSING FIBER-REINFORCED RESIN MATERIALS

(71) Applicant: LENOVO (SINGAPORE) PTE. LTD., Singapore (SG)

(72) Inventor: Tsunenori Yanagisawa, Kanagawa-ken (JP)

(73) Assignee: LENOVO (SINGAPORE) PTE LTD, Singapore (SG)

( * ) Notice: Subject to any disclaimer, the term of this patent is extended or adjusted under 35 U.S.C. 154(b) by 332 days.

(21) Appl. No.: 15/406,532

(22) Filed: Jan. 13, 2017

(65) Prior Publication Data

US 2017/0197373 A1 Jul. 13, 2017

(30) Foreign Application Priority Data

Jan. 13, 2016 (JP) .................. 2016-004640

(51) Int. Cl.
| | | |
|---|---|---|
| *B29C 70/46* | (2006.01) | |
| *B29C 70/22* | (2006.01) | |
| *B29K 105/08* | (2006.01) | |
| *B29K 307/04* | (2006.01) | |

(52) U.S. Cl.
CPC ............ *B29C 70/46* (2013.01); *B29C 70/224* (2013.01); *B29K 2105/0872* (2013.01); *B29K 2307/04* (2013.01)

(58) Field of Classification Search
CPC ....... B29C 70/22; B29C 70/224; B29C 70/46; B29C 33/0033; B29C 2043/3668; B29C 45/14344; B29C 45/2628; B29C 70/545; B29C 2793/0045; B29C 61/0658; B29C 65/364
See application file for complete search history.

(56) References Cited

U.S. PATENT DOCUMENTS

| | | | |
|---|---|---|---|
| 3,704,194 A | | 11/1972 | Harrier |
| 5,246,520 A | * | 9/1993 | Scanlon ................ B29C 70/504 |
| | | | 156/245 |
| 5,252,279 A | * | 10/1993 | Gore ..................... B29C 70/545 |
| | | | 264/154 |

(Continued)

FOREIGN PATENT DOCUMENTS

| | | |
|---|---|---|
| EP | 00688647 B1 | 3/2000 |
| JP | 49-001632 | 1/1974 |
| JP | 56-161122 | 12/1981 |

(Continued)

*Primary Examiner* — Stella K Yi
(74) *Attorney, Agent, or Firm* — Anthony P. Ng; Russell Ng PLLC (57) ABSTRACT

A method for processing a fiber-reinforced resin material is disclosed. A fiber-reinforced resin material is disposed between an upper die having a projection and a lower die having a recess corresponding to the projection. The fiber-reinforced resin material includes reinforced fibers having alternately intersecting warp yarns and weft yarns and are impregnated with a thermoplastic resin. The fiber-reinforced resin material is then heated to soften the thermoplastic resin, and the upper die and the lower die are placed close to each other in order to insert the projection into a gap between the warp yarns and the weft yarns of the reinforced fibers such that the gap between the warp yarns and the weft yarns is expanded to form a through hole.

3 Claims, 7 Drawing Sheets

(56) References Cited

U.S. PATENT DOCUMENTS 5,637,272 A 6/1997 Yamamoto et al.

FOREIGN PATENT DOCUMENTS

| JP | 59-201821 | | 11/1984 |
|----|-----------|---|---------|
| JP | 03-101910 | | 4/1991 |
| JP | 05-2609868 | | 10/1993 |
| JP | 08-001690 A | | 1/1996 |
| JP | 10100175 | * | 9/1996 |
| JP | 10-100175 A | | 4/1998 |
| JP | 2002322588 A | | 11/2002 |
| JP | 2012-153068 | | 8/2012 |
| WO | 2004/018186 A1 | | 3/2004 |

* cited by examiner

METHOD FOR PROCESSING FIBER-REINFORCED RESIN MATERIALS

PRIORITY CLAIM

The present application claims benefit of priority under 35 U.S.C. §§ 120, 365 to the previously filed Japanese Patent Application No. JP2016-004640 with a priority date of Jan. 13, 2017, which is incorporated by reference herein.

TECHNICAL FIELD

The present invention relates to fiber-reinforced resin materials in general, and in particular to a method for processing a fiber-reinforced resin material.

BACKGROUND

Chassis of electronic devices, such as laptop personal computers (laptop PCs), tablet personal computers (tablet Ps), smartphones, and cellular phones, need to be lightweight, thin and strong. In view of this, a fiber-reinforced resin, e.g., carbon fiber reinforced plastics (CFRP), in which reinforced fibers, e.g., carbon fibers, are impregnated with a resin has been widely employed for chassis of electronic devices.

Figure 10:
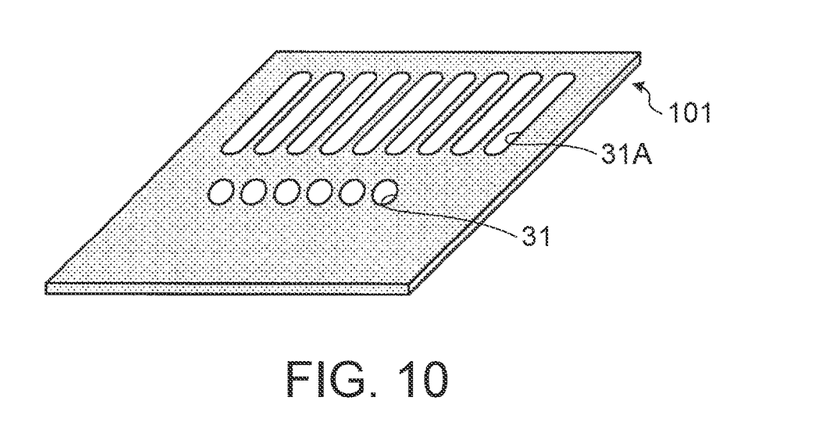
FIG. 10 illustrates an example of a fiber-reinforced resin material having a through hole.
Figure 11:
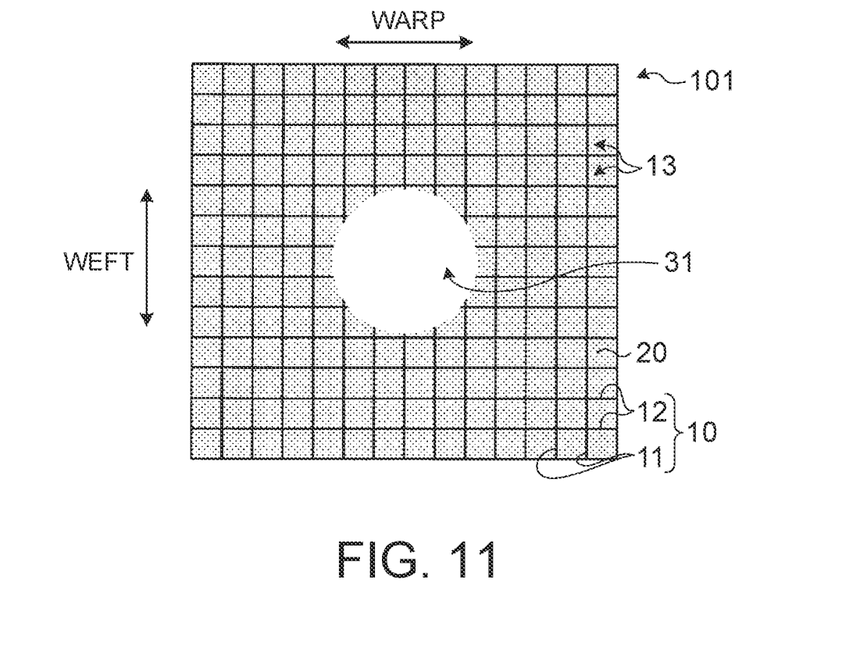
FIG. 11 illustrates an example of a fiber-reinforced resin material having a circular through hole formed by a known method for processing a fiber-reinforced resin material.
Figure 12:
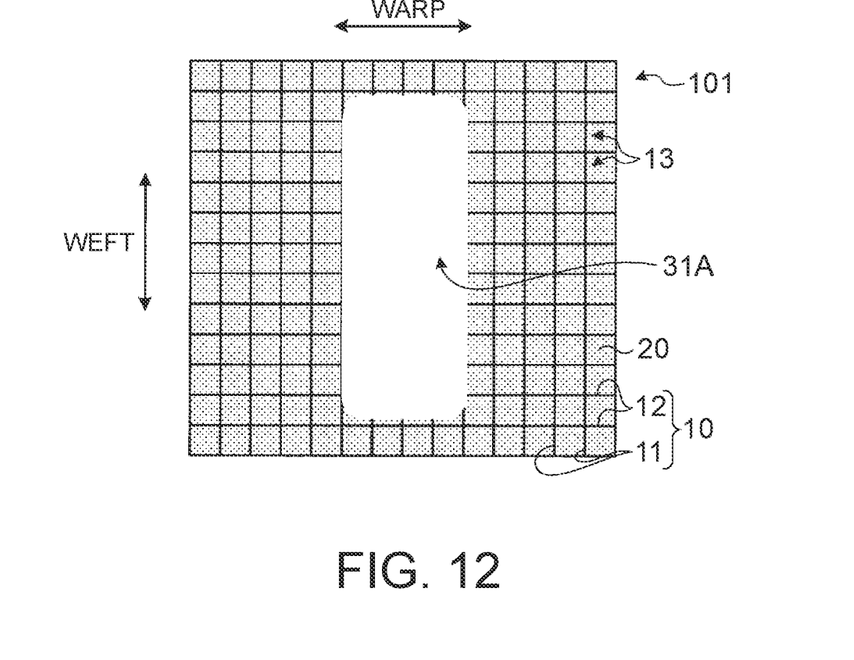
FIG. 12 illustrates an example of a fiber-reinforced resin material having an oval through hole formed by the known method for processing a fiber-reinforced resin material.

For example, as shown in FIG. 10, in order to form a through hole 31 for screws or a through hole 31A as air inlet/outlet in a fiber-reinforced resin material 101, a technique known to-date includes a primary process of shaping a fiber-reinforced resin material 101 is performed, and then a secondary process of press-cutting with a press cutter, machining with a milling cutter, or cutting with a laser is performed. However, with the above-mentioned processing technique, the entire part of reinforced fibers 10 corresponding to through hole 31 or 31A is cut off and removed in a hole forming step as illustrated in FIGS. 11-12, resulting in the problem of a decrease in strength of a region around the through hole 31 or 31A.

Since the fiber-reinforced resin material is strong, press-cutting or machining can shorten the life of a tool, resulting in another problem of increased costs. In addition, since the fiber-reinforced resin material needs to be irradiated with high-power laser light for a long period in laser processing, the matrix resin around the through hole is burnt, resulting in yet another problem of a failure in forming a normal through hole.

Consequently, it would be preferable to provide an improved method for processing a fiber-reinforced resin material without a decrease in strength after processing, without an increase in costs, and without a degradation of processing accuracy.

SUMMARY

In accordance with an embodiment of the present disclosure, a fiber-reinforced resin material is disposed between an upper die having a projection and a lower die having a recess corresponding to the projection. The fiber-reinforced resin material includes reinforced fibers having alternately intersecting warp yarns and weft yarns and are impregnated with a thermoplastic resin. The fiber-reinforced resin material is then heated to soften the thermoplastic resin, and the upper die and the lower die are placed close to each other in order to insert the projection into a gap between the warp yarns and the weft yarns of the reinforced fibers such that the gap between the warp yarns and the weft yarns is expanded to form a through hole.

All features and advantages of the present disclosure will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIGS. 3(a)-3(c) are cross-sectional views illustrating an example of the method for processing a fiber-reinforced resin material of the present disclosure;

FIGS. 6(a)-6(c) are cross-sectional views illustrating another example of the method for processing a fiber-reinforced resin material of the present disclosure;

DETAILED DESCRIPTION

I. First Embodiment

Figure 1:
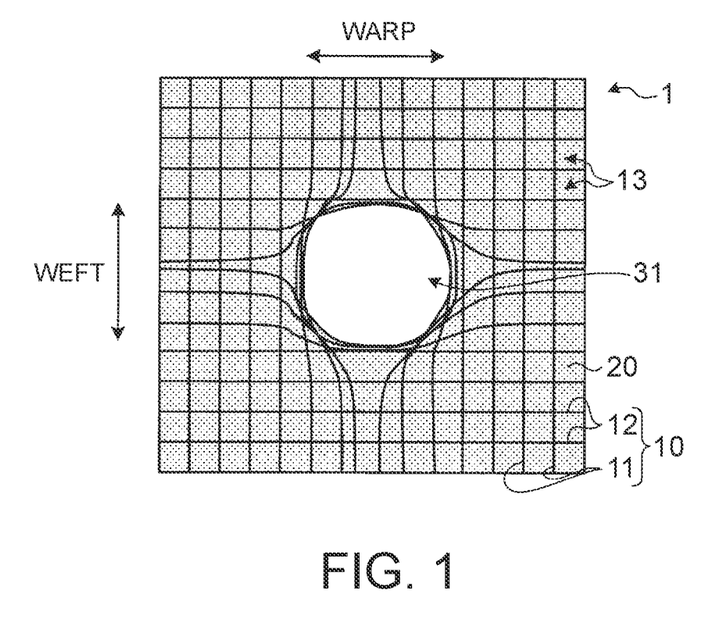
FIG. 1 illustrates an example of a fiber-reinforced resin material having a circular through hole formed by a method for processing a fiber-reinforced resin material of the present disclosure.
Figure 2:
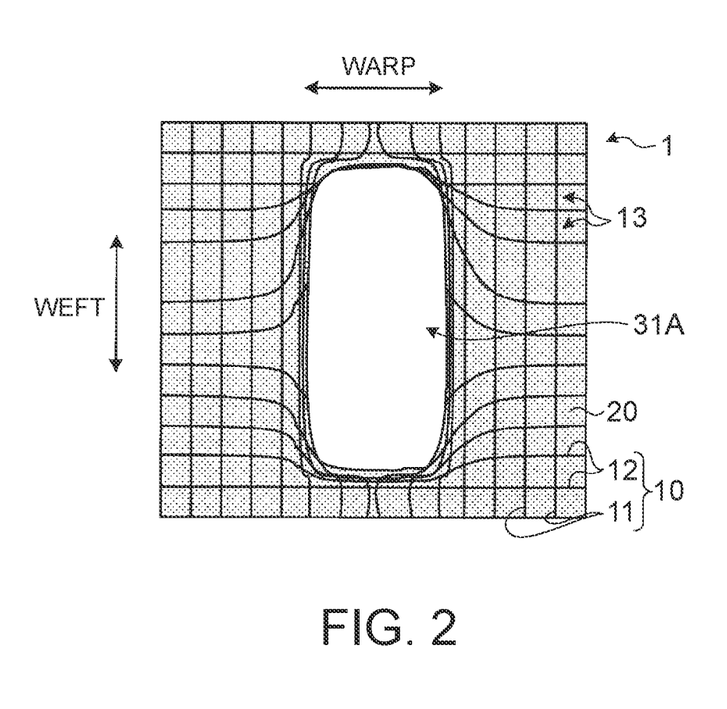
FIG. 2 illustrates an example of a fiber-reinforced resin material having an oval through hole formed by the method for processing a fiber-reinforced resin material of the present disclosure.

A method for forming a through hole 31 or 31A in a fiber-reinforced resin material 1 is illustrated in FIGS. 1-2. The fiber-reinforced resin material 1 to be processed in this embodiment is prepregs in which reinforced fibers 10 having a structure with alternately intersecting warp yarns 11 and weft yarns 12 (e.g., a woven structure) are impregnated with a matrix resin 20. Specifically, the fiber-reinforced resin material 1 is a CFRP (a plate of laminated prepregs) in which prepregs are laminated to form a desired laminated structure or is in a state where prepregs are stacked to form a desired laminated structure. The reinforced fibers 10 are carbon fibers, and the matrix resin 20 is a thermoplastic resin. The through hole 31 or 31A formed in the fiber-reinforced resin material 1 is used as a hole for screwing, an air inlet/outlet, a hole for a loudspeaker, and/or a hole for illumination, for example.

Figure 3:
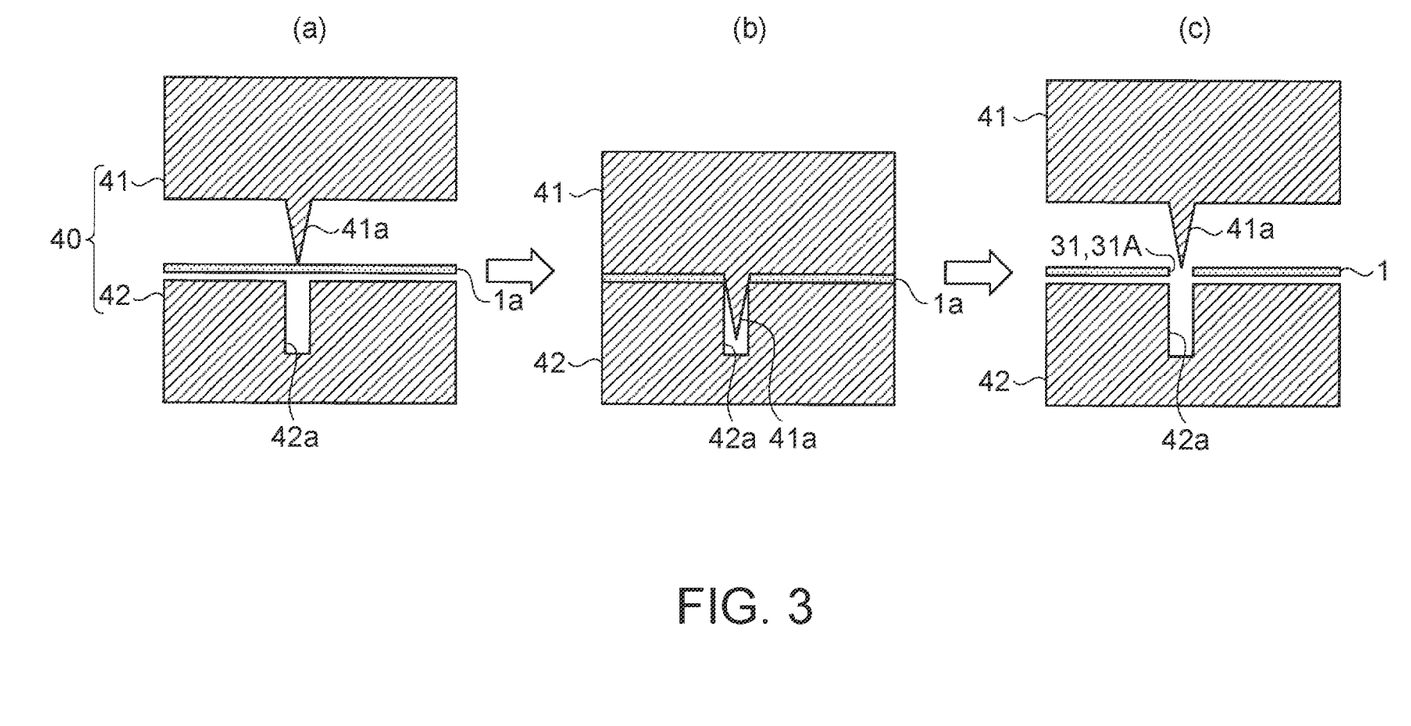

The method for processing a fiber-reinforced resin material according to this embodiment includes a disposing step and a through hole forming step. As illustrated in FIG. 3(a), the disposing step is a step of disposing a fiber-reinforced resin material 1a yet to be processed in a die 40 including an upper die 41 and a lower die 42. Specifically, in the disposing step, the upper die 41 having a projection 41a and the lower die 42 having a recess 42a corresponding to the projection 41a are prepared, and the fiber-reinforced resin material 1a is disposed between the upper die 41 and the lower die 42.

Here, the projection 41a of the upper die 41 is used for forming a through hole 31 or 31A in the fiber-reinforced resin material 1a in the subsequent through hole forming step. As illustrated in FIGS. 3(a)-3(c), the projection 41a has a tapered cross-sectional shape that gradually narrows toward the lower die 42. A plane shape of the projection 41a when viewed from the lower die 42 corresponds to a plane shape of the through hole 31 or 31A formed in the through hole forming step.

For example, as illustrated in FIG. 1, in the case of forming the circular through hole 31 in the fiber-reinforced resin material 1a, the projection 41a has a circular plane shape when viewed from the lower die 42. The overall shape of the projection 41a in this case is, for example, a conical shape having a circular bottom. On the other hand, as illustrated in FIG. 2, in the case of forming the oval through hole 31A in the fiber-reinforced resin material 1a, the projection 41a has a rounded rectangle or oval plane shape when viewed from the lower die 42. The overall shape of the projection 41a in this case is, for example, a quadrangular pyramid shape having a rounded rectangular bottom.

Next, the through hole forming step is a step of forming the through hole 31 or 31A in the fiber-reinforced resin material 1a. In the through hole forming step, the fiber-reinforced resin material 1a is heated by using contact heat transfer caused by heating the die 40, for example, or by an unillustrated heater or the like, thereby melting and softening the thermoplastic resin (matrix resin 20). In the state where the thermoplastic resin of the fiber-reinforced resin material 1a is melted and softened in the manner described above, the upper die 41 and the lower die 42 are placed close to each other as illustrated in FIG. 3(b) so that the fiber-reinforced resin material 1a is subjected to hot pressing.

In the through hole forming step, concurrently with hot pressing of the fiber-reinforced resin material 1a, the projection 41a is inserted into the fiber-reinforced resin material 1a, as illustrated in FIG. 3(b), thereby forming a through hole 31 or 31A, as illustrated in FIG. 3(c). In the through hole forming step, when forming the through hole 31 or 31A, the projection 41a is inserted into a weave pattern 13 formed by the warp yarns 11 and the weft yarns 12 of the reinforced fibers 10 as illustrated in FIGS. 1 and 2, thereby forming a through hole 31 or 31A by expanding the weave pattern 13. In this manner, in the through hole forming step, the through hole 31 or 31A is formed in a state where the matrix resin 20 of the fiber-reinforced resin material 1a after processing is melted and softened. The "weave pattern" here refers to a gap between the warp yarns 11 and the weft yarns 12 of the reinforced fibers 10.

As illustrated in FIGS. 1-2, the fiber-reinforced resin material 1 processed by the method for processing a fiber-reinforced resin material according to this embodiment has the through hole 31 or 31A formed in the thickness direction thereof. The through hole 31 or 31A is not formed by cutting and removing the reinforced fibers 10, unlike a known technique, but by expanding the weave pattern 13 of the reinforced fibers 10 (by pushing away the reinforced fibers 10) in directions (warp and weft directions) orthogonal to the thickness direction.

Thus, in the processed fiber-reinforced resin material 1, the density of a part of the reinforced fibers 10 around the through hole 31 or 31A is higher than the density of the other part in the directions orthogonal to the thickness direction. That is, the reinforced fibers 10 that have been pushed away in forming the through hole 31 or 31A are densely arranged around the through hole 31 or 31A so that gaps between the warp yarns 11 and gaps between the weft yarns 12 in a region around the through hole 31 or 31A are narrower than gaps between the warp yarns 11 and gaps between the weft yarns 12 in the other region. Accordingly, the region around the through hole 31 or 31A is reinforced by the reinforced fibers 10 so that a decrease in strength of the region around the through hole 31 or 31A can be suppressed.

With the method for processing a fiber-reinforced resin material according to this embodiment, the through hole 31 or 31A is formed not by cutting and removing the reinforced fibers 10 but by expanding the weave pattern 13 between the warp yarns 11 and the weft yarns 12 of the reinforced fibers 10. Thus, the fiber-reinforced resin material 1 can be processed without increases in costs and a processing period and degradation of processing accuracy, which have occurred in a known processing method. In addition, in the method for processing a fiber-reinforced resin material according to this embodiment, the thermoplastic resin that is melted and softened by heat is used as the matrix resin 20. Thus, concurrently with formation of the through hole 31 or 31A in the through hole forming step, the fiber-reinforced resin material 1 can be formed in a desired shape by hot press forging.

II. Second Embodiment

The method for processing a fiber-reinforced resin material according to the second embodiment is similar to the method of the first embodiment except for using a thermosetting resin as a matrix resin 20. A fiber-reinforced resin material 1 to be processed in the second embodiment is prepregs in which reinforced fibers 10 having a structure with alternately intersecting warp yarns 11 and weft yarns 12 (e.g., a woven structure) are impregnated with the matrix resin 20, as in the first embodiment. The fiber-reinforced resin material 1 is, for example, in a state where prepregs are laminated to form a desired laminated structure, the reinforced fibers 10 are carbon fibers, and the matrix resin 20 is a thermosetting resin.

The method for processing a fiber-reinforced resin material according to the second embodiment includes a disposing step and a through hole forming step. As illustrated in FIG. 3(a), in the disposing step, a fiber-reinforced resin material 1a in which the reinforced fibers 10 are impregnated with a thermosetting resin (matrix resin 20) yet to be cured is disposed between an upper die 41 having a projection 41a and a lower die 42 having a recess 42a corresponding to the projection 41a. Specifically, in the disposing step of the first embodiment, the processed fiber-reinforced resin material 1a including the cured thermoplastic resin is disposed in the die 40, whereas in the disposing step of the second embodiment, the fiber-reinforced resin material 1a that includes an uncured thermosetting resin and has not been shaped yet is disposed in the die 40. The upper die 41 and the lower die 42 in the second embodiment are similar to those used in the first embodiment.

Subsequently, in the through hole forming step, before the thermosetting resin (matrix resin 20) is completely cured, the upper die 41 and the lower die 42 are placed close to each other so that as illustrated in FIGS. 1-2, the projection 41a is inserted into the weave pattern 13 formed by the warp yarns 11 and the weft yarns 12 of the reinforced fibers 10, thereby forming the through hole 31 or 31A by expanding the weave pattern 13. In the through hole forming step of the second embodiment, the through hole 31 or 31A can be formed by using any one of hot pressing or cold pressing.

In the case of using hot pressing, in a manner similar to the first embodiment, in a state where the fiber-reinforced resin material 1a is heated and the thermosetting resin (matrix resin 20) is not completely cured, the upper die 41 and the lower die 42 are placed close to each other, as illustrated in FIG. 3(b) and the fiber-reinforced resin material 1a is subjected to hot pressing. In this manner, the projection 41a penetrates the fiber-reinforced resin material 1a so that the through hole 31 or 31A, as illustrated in FIG. 3(c), is formed and the fiber-reinforced resin material 1a is shaped.

On the other hand, in the case of using cold pressing, prepregs are disposed in the die 40 to form a desired laminated structure, and then, the upper die 41 and the lower die 42 are placed close to each other, and the fiber-reinforced resin material 1a is subjected to cold pressing. Subsequently, the die 40 is heated, for example, so that the fiber-reinforced resin material 1a is cured by heat. In this manner, the projection 41a penetrates the fiber-reinforced resin material 1a so that the through hole 31 or 31A, as illustrated in FIG. 3(c) is formed and the fiber-reinforced resin material 1a is shaped.

The fiber-reinforced resin material 1 processed by the method for processing a fiber-reinforced resin material according to this embodiment includes the through hole 31 or 31A formed by expanding the weave pattern 13 between the warp yarns 11 and the weft yarns 12 of the reinforced fibers 10 (by pushing the reinforced fibers 10) in directions orthogonal to the thickness direction (warp and weft directions), as illustrated in FIGS. 1-2.

Thus, in the processed fiber-reinforced resin material 1, the density of a part of the reinforced fibers 10 around the through hole 31 or 31A is higher than the density of the other part in the directions orthogonal to the thickness direction, and gaps between the warp yarns 11 and gaps between the weft yarns 12 in a region around the through hole 31 or 31A are narrower than gaps between the warp yarns 11 and gaps between the weft yarns 12 in the other region. Accordingly, the region around the through hole 31 or 31A is reinforced by the reinforced fibers 10 so that a decrease in strength of the region around the through hole 31 or 31A can be suppressed.

The method for processing a fiber-reinforced resin material according to the second embodiment can process the fiber-reinforced resin material 1 without increases in costs and a processing period and degradation of processing accuracy. Since the method for processing a fiber-reinforced resin material according to the second embodiment uses a thermosetting resin that is cured by heat as the matrix resin 20, the through hole 31 or 31A can be formed concurrently with shaping of the fiber-reinforced resin material 1 in the through hole forming step.

III. Other Embodiments

In the through hole forming step of each of the first and second embodiments described above, it can be difficult to push the entire part of the reinforced fibers 10 corresponding to the through hole 31 or 31A with some sizes or aspect ratios of the through hole 31 or 31A to be formed. In such a case, a cutting step is preferably performed before the disposing step.

Figure 4:
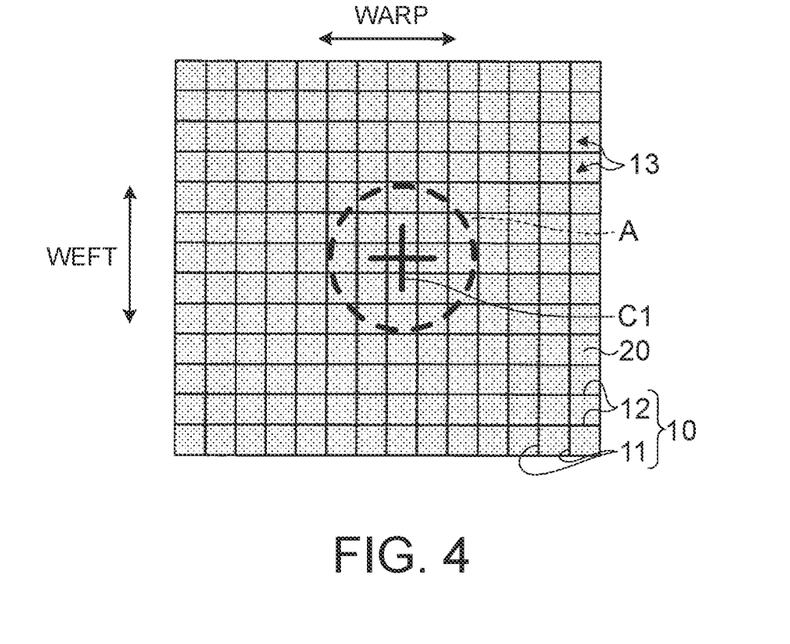
FIG. 4 illustrates an example of a cutting step performed in forming a circular through hole in the method for processing a fiber-reinforced resin material of the present disclosure.
Figure 5:
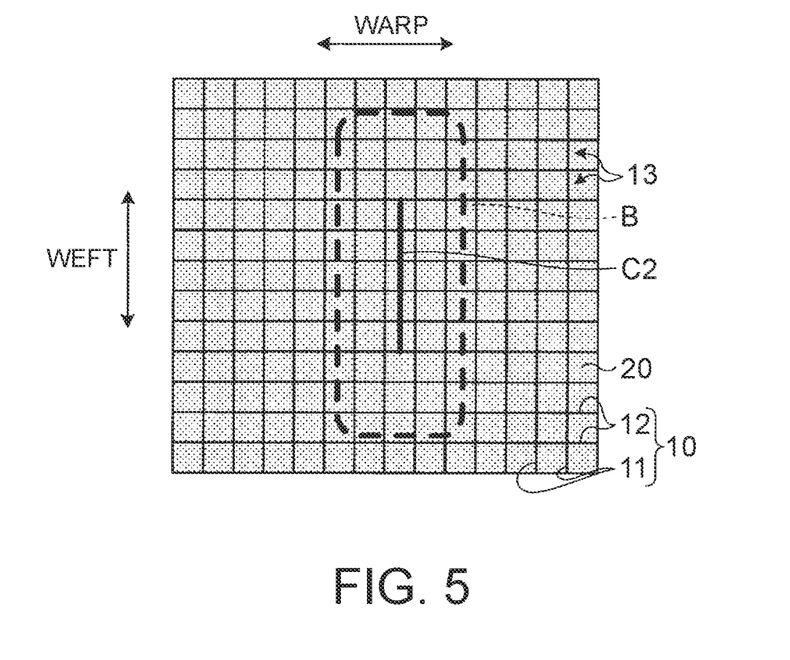
FIG. 5 illustrates an example of a cutting step performed in forming an oval through hole in the method for processing a fiber-reinforced resin material of the present disclosure.

As illustrated in FIGS. 4-5, in the cutting step, a part of the reinforced fibers 10 in a region where the through hole 31 or 31A is to be formed in the through hole forming step is cut off. A method for processing a fiber-reinforced resin material including the cutting step will now be described.

First, the reinforced fibers 10 are impregnated with the matrix resin 20, thereby preparing prepregs. Subsequently, as the cutting step, a part of the reinforced fibers 10 constituting the prepregs and included in a region A or B where the through hole 31 or 31A is to be formed is cut off. Thereafter, the prepregs that have been cut off are laminated to form a desired laminated structure. Here, in a case where the matrix resin 20 is a thermoplastic resin, the laminated prepregs may be subjected to hot pressing so that a plate of laminated prepregs (fiber-reinforced resin material 1a) is formed. Lastly, the through hole forming step according to the first or second embodiment is performed, thereby forming a through hole 31 or 31A.

Here, as illustrated in FIG. 4, for example, in the case of forming the circular through hole 31 in the subsequent through hole forming step, in the cutting step, the reinforced fibers 10 (the warp yarns 11 and the weft yarns 12) are cut off in the warp and weft directions with respect to a center of the region A where the through hole 31 is to be formed, thereby forming cross-shaped slits C1. The lengths of the slits C1, that is, the numbers of warp yarns 11 and weft yarns 12 to be cut off are determined in consideration of the size of the through hole 31 to be formed.

The shape of the slits C1 for forming the circular through hole 31 is not limited to the cross-shape, and only some of the reinforced fibers 10 (weft yarns 12), for example, may be cut off in the warp direction or only some of the reinforced fibers 10 (warp yarns 11) may be cut off in the weft direction.

In addition, as illustrated in FIG. 5, for example, in the case of forming the oval through hole 31A elongated in the warp direction in the subsequent through hole forming step, in the cutting step, the reinforced fibers 10 (weft yarns 12) are cut off in the warp direction with respect to the center of the region B where the through hole 31A is to be formed, thereby forming a linear slit C2. The length of the slit C2, that is, the number of weft yarns 12 to be cut off, is determined in consideration of the size of the through hole 31A to be formed.

In the case of forming the oval through hole 31A, the slit C2 is preferably formed only in the direction parallel to the direction in which the through hole 31A extends. For example, as illustrated in FIG. 5, in the case of forming the oval through hole 31A elongated in the warp direction in the subsequent through hole forming step, only a part of the weft yarns 12 intersecting the warp direction along which the oval through hole 31A extends is cut off and the warp yarns 11 are not cut off. In this manner, a decrease in strength caused by cutting the reinforced fibers 10 in the cutting step can be minimized.

The cutting step as described above included in the method for processing a fiber-reinforced resin material according to the first or second embodiment can ensure formation of the through hole 31 or 31A by pushing away the reinforced fibers 10 in the subsequent through hole forming step, irrespective of the size and aspect ratio of the through hole 31 or 31A to be formed. In the cutting step, only a minimum part of the reinforced fibers 10 is cut off and is not removed. Thus, after formation of the through hole 31 or 31A in the through hole forming step, a part of the reinforced fibers 10 that has been cut off in the cutting step is disposed around the through hole 31 or 31A together with a part of the reinforced fibers 10 that has been pushed away, and also contributes to enhancement of strength of a region around the through hole 31 or 31A.

In the through hole forming step in the first or second embodiment, only the through hole 31 or 31A is formed as processing on the fiber-reinforced resin material 1. Alternatively, a rib and/or a boss, for example, can be formed concurrently with formation of the through hole 31 or 31A.

Figure 6:
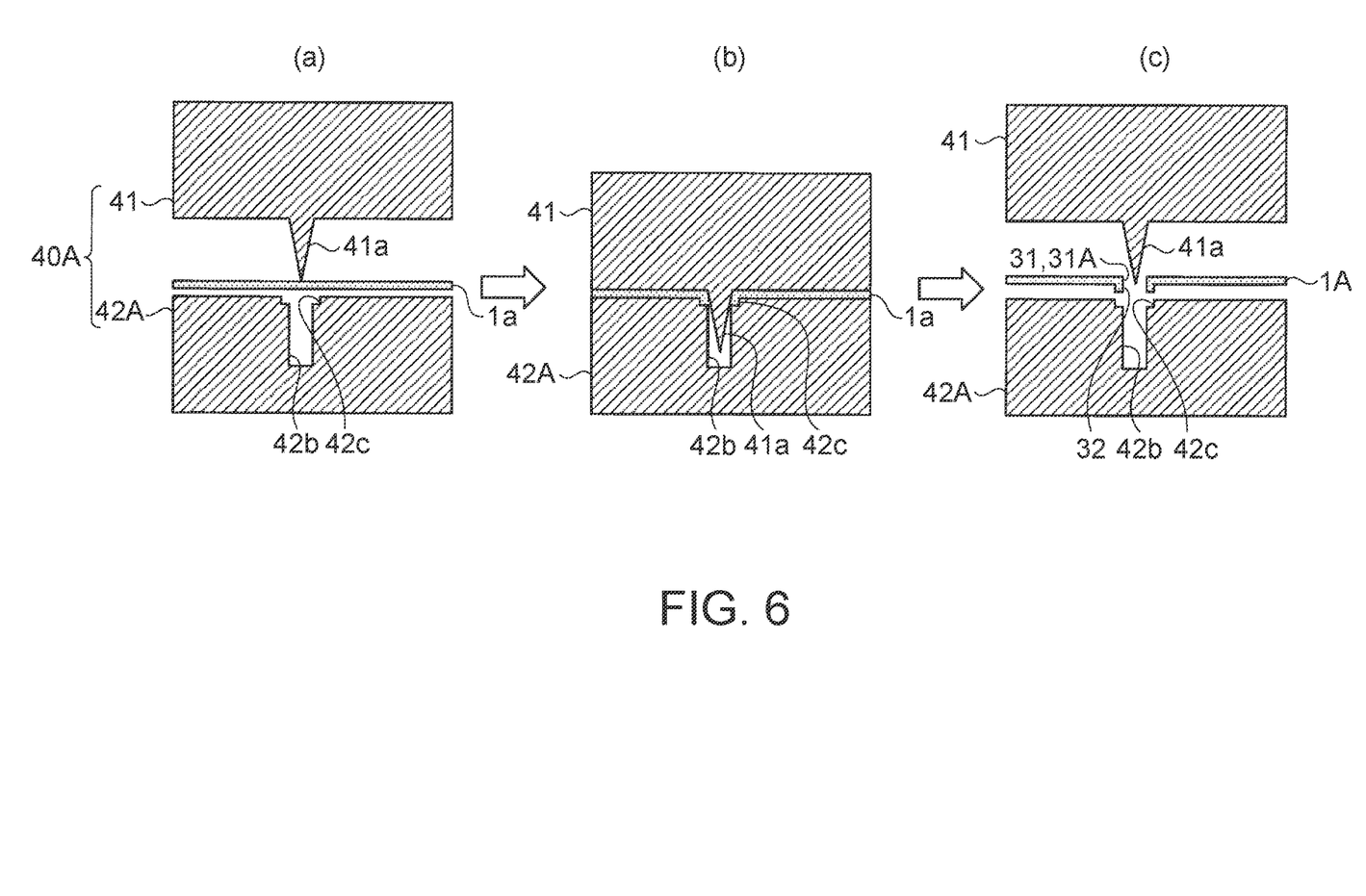

In the case of forming a rib 32 concurrently with formation of the through hole 31 or 31A, for example, as illustrated in FIG. 6, a die 40A different from the die 40 used in the methods for processing a fiber-reinforced resin material according to the first and second embodiments is used. The die 40A includes an upper die 41 and a lower die 42A, and the upper die 41 is similar to the upper die used in the methods for processing a fiber-reinforced resin material according to the first and second embodiments. On the other hand, the lower die 42A has a first recess 42b and a second recess 42c disposed above the first recess 42b and having an opening larger than an opening of the first recess 42b.

In the disposing step, as illustrated in FIG. 6(a), a fiber-reinforced resin material 1a is disposed between the upper die 41 having a projection 41a and the lower die 42A having the first recess 42b and the second recess 42c. Subsequently, in the through hole forming step, the fiber-reinforced resin material 1a is heated so that the thermoplastic resin is melted and softened (in the first embodiment) or the thermosetting resin is cured (in the second embodiment), and the fiber-reinforced resin material 1a is subjected to hot pressing as illustrated in FIG. 6(b).

In the through hole forming step, concurrently with the hot pressing of the fiber-reinforced resin material 1a, the projection 41a is inserted into a weave pattern 13 formed by warp yarns 11 and weft yarns 12 of the reinforced fibers 10 as illustrated in FIGS. 1, 2, and 6(b), thereby forming a through hole 31 or 31A by expanding the weave pattern 13. At the same time, the matrix resin 20 (the thermoplastic resin or the thermosetting resin) is caused to flow into the second recess 42c so that as illustrated in FIGS. 6(c) and 7, a rib 32 is formed to project in the thickness direction from a region around the through hole 31 or 31A.

Figure 7:
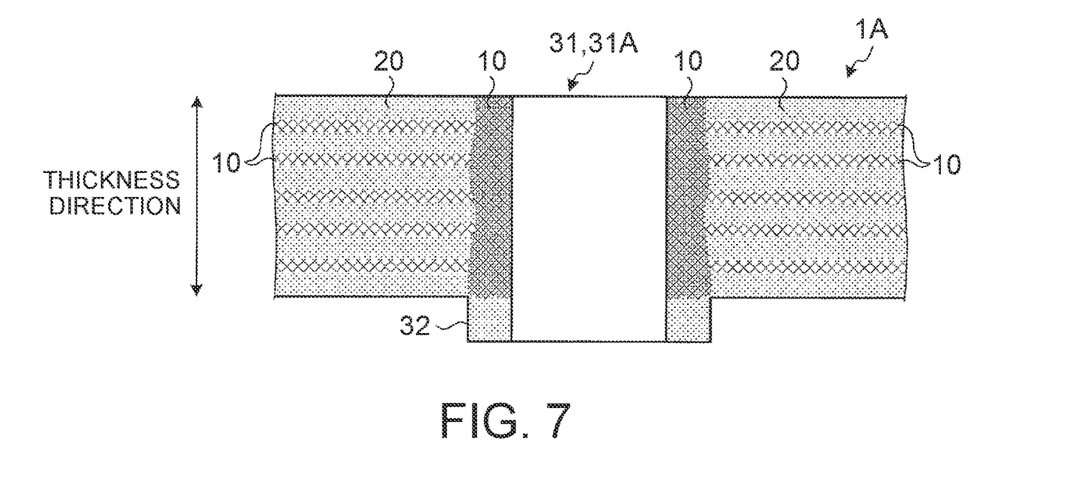
FIG. 7 is a cross-sectional view of a fiber-reinforced resin material processed by the method for processing a fiber-reinforced resin material of the present disclosure.

As illustrated in FIG. 7, a part of the reinforced fibers 10 that has been pushed away in forming the through hole 31 or 31A is basically disposed around the through hole 31 or 31A. Thus, most part of the rib 32 is constituted by the matrix resin 20, and the density of the part of the reinforced fibers 10 constituting the rib 32 is lower than the density of the other part, that is, a part of the fiber-reinforced resin material 1A except for the rib 32.

The through hole forming step performed by the method for processing a fiber-reinforced resin material according to the first or second embodiment enables a plurality of processes to be performed at the same time. In addition, since the matrix resin 20 can escape into the second recess 42c in forming the through hole 31 or 31A, the through hole 31 or 31A can be easily formed. Furthermore, since the rib 32 is formed around the through hole 31 or 31A, the rib 32 can reinforce a region around the through hole 31 or 31A so that a decrease in strength of the region around the through hole 31 or 31A can be further suppressed.

Figure 8:
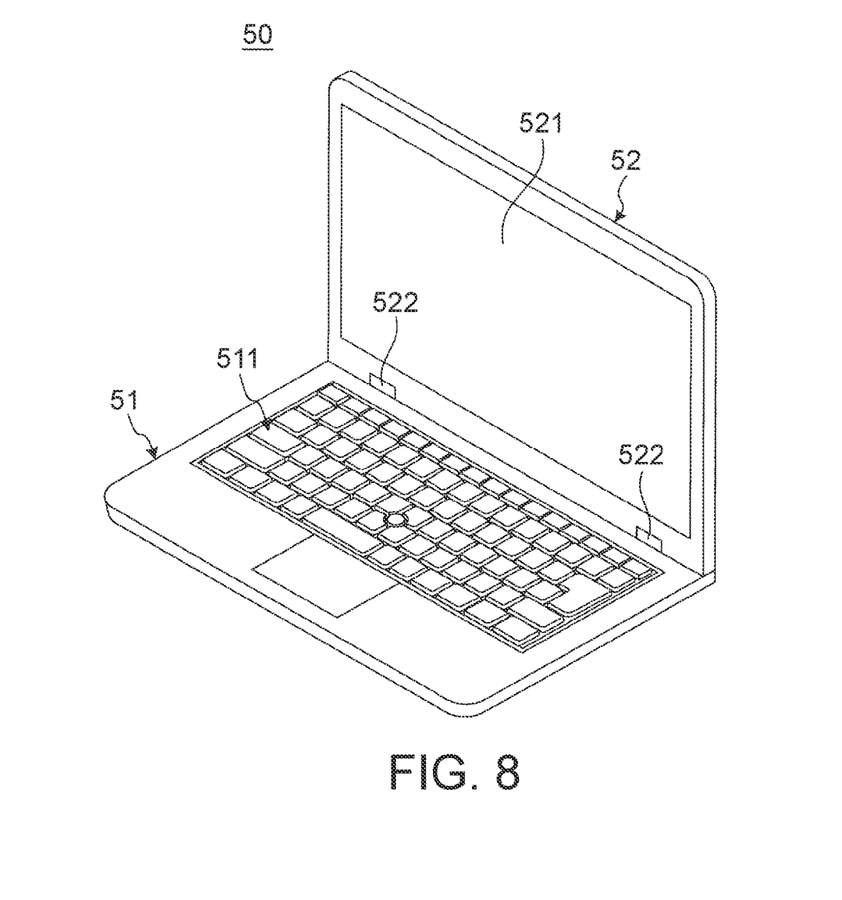
FIG. 8 is a perspective view of an electronic device to which a fiber-reinforced resin material of the present disclosure is applicable.

The fiber-reinforced resin material 1 processed by the processing method as described above can be used for a chassis of a laptop PC 50 as illustrated in FIG. 8, for example. The laptop PC 50 illustrated in FIG. 8 is of a clamshell type including a device body 51 including a keyboard device 511, and a rectangular plate-shaped lid 52 including a display device 521 of, for example, a liquid crystal display, and the lid 52 is coupled to the device body 51 by left and right hinges 522 to be freely opened and closed. The device body 51 houses unillustrated electronic components such as a substrate, an arithmetic processing unit, a hard disk device, and a memory.

Figure 9:
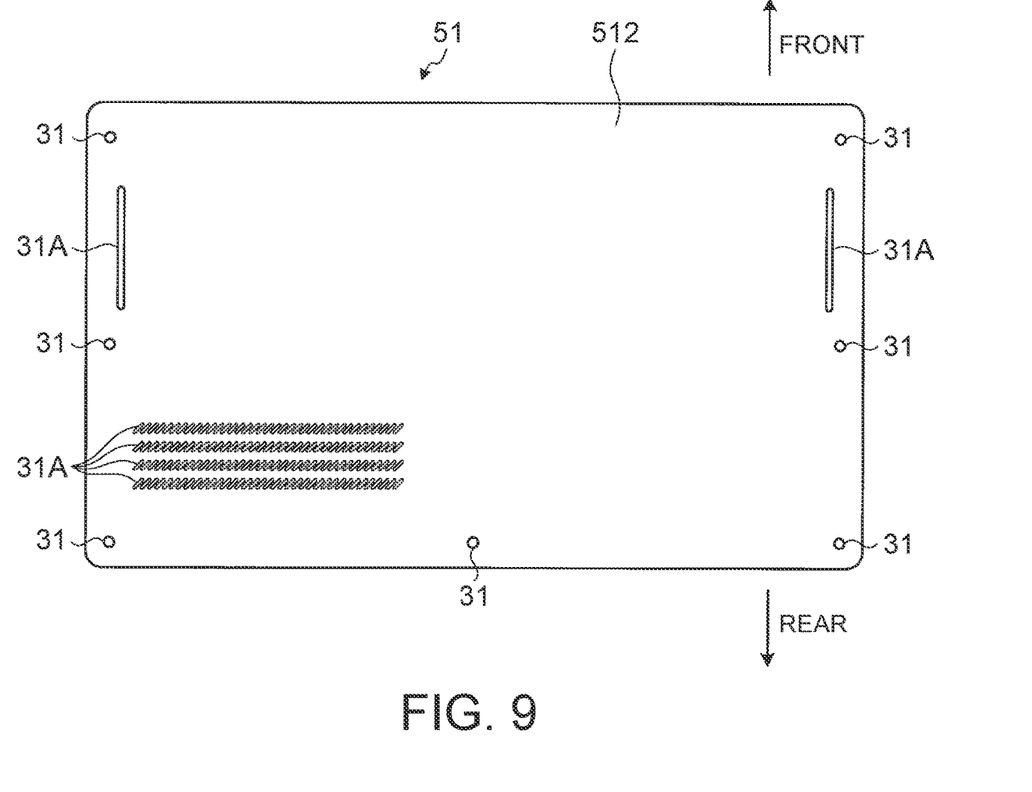
FIG. 9 is a plan view of a rear cover of a device body of the electronic device illustrated in FIG. 8.

The use of the method for processing a fiber-reinforced resin material according to the first or second embodiment enables easy formation of the through hole 31 as a hole for screwing or the through hole 31A as an air inlet/outlet in a rear cover 512 of the device body 51 as illustrated in FIG. 9, for example.

As described above, methods for processing a fiber-reinforced resin material and fiber-reinforced resin materials according to embodiments of the present invention have been specifically described. The present invention, however, is not limited to the above description, and should be widely understood based on claims. Various changes and modifications, for example, based on the description are, of course, included in the gist of the present invention.

For example, the reinforced fibers 10 are not limited to carbon fibers, and may be metal fibers or vegetable fibers, for example. The reinforced fibers 10 may not have a woven structure as illustrated in FIGS. 1-2, and may have a structure in which prepregs of a uni-direction (UD) material where fibers run in one direction are stacked in warp and weft directions, for example. In such a structure, a gap between warp fibers and weft fibers is expanded by the projection 41a of the upper die 41 so that the through hole 31 or 31A can be formed. The reinforced fibers 10 may not have a woven structure as illustrated in FIGS. 1-2, and may have a structure in which nonwoven prepregs of entangled fibers are laminated.

As has been described, the present invention provides an improved method for processing a fiber-reinforced resin material.

While the invention has been particularly shown and described with reference to a preferred embodiment, it will be understood by those skilled in the art that various changes in form and detail may be made therein without departing from the spirit and scope of the invention.

What is claimed is:

1. A method, comprising:
    cutting a part of reinforced fibers within a fiber-reinforced resin material in a region where a through hole is to be formed, wherein said reinforced fibers are alternately intersecting warp yarns and weft yarns and are impregnated with a thermoplastic resin;
    disposing said fiber-reinforced resin material between an upper die having a projection and a lower die having a recess corresponding to said projection, wherein said recess of said lower die includes a first recess and a second recess located above said first recess and having an opening larger than an opening of said first recess;
    heating said fiber-reinforced resin material to soften said thermoplastic resin; and
    after heating said fiber-reinforced resin material, forming a through hole by placing said upper die and said lower die close to each other to insert said projection into a gap between said warp yarns and said weft yarns of said reinforced fibers such that said gap between said warp yarns and said weft yarns is expanded to form said through hole.

2. The method of claim 1, wherein said projection is inserted into said gap between said warp yarns and said weft yarns so that said gap between said warp yarns and said weft yarns is expanded in a direction orthogonal to a thickness direction of said reinforced fibers and that said thermoplastic resin is caused to flow into said second recess.

3. The method of claim 1, wherein said reinforced fibers are carbon fibers.

* * * * *